US008739021B2

(12) United States Patent
Yuniardi

(10) Patent No.: US 8,739,021 B2
(45) Date of Patent: May 27, 2014

(54) VERSION HISTORY INSIDE DOCUMENT

(75) Inventor: Nino Yuniardi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 12/939,170

(22) Filed: Nov. 4, 2010

(65) Prior Publication Data

US 2012/0117457 A1    May 10, 2012

(51) Int. Cl.
*G06F 17/00*    (2006.01)

(52) U.S. Cl.
USPC ........... 715/229; 715/255; 715/764; 715/810; 709/206; 709/219

(58) Field of Classification Search
USPC ......... 715/200, 201, 202, 203, 205, 209, 210, 715/226, 229, 231, 234, 253, 254, 255, 256, 715/273, 750, 752, 760
See application file for complete search history.

(56) References Cited

U.S. PATENT DOCUMENTS

| | | | |
|---|---|---|---|
| 6,598,060 B2 | 7/2003 | Goldick | |
| 7,487,457 B2 * | 2/2009 | Ben-Shachar et al. | ........ 715/753 |
| 7,559,016 B1 | 7/2009 | Rakowski et al. | |
| 7,613,780 B2 | 11/2009 | DeSalvo | |
| 7,818,678 B2 * | 10/2010 | Massand | ........................ 715/751 |
| 7,908,247 B2 * | 3/2011 | Ngo et al. | ...................... 707/638 |
| 7,933,952 B2 * | 4/2011 | Parker et al. | .................. 709/204 |
| 2004/0085354 A1 * | 5/2004 | Massand | ........................ 345/751 |
| 2006/0010125 A1 * | 1/2006 | Beartusk et al. | ................... 707/4 |
| 2006/0026502 A1 * | 2/2006 | Dutta | ............................ 715/511 |
| 2006/0053380 A1 * | 3/2006 | Spataro et al. | ................. 715/753 |
| 2006/0080432 A1 * | 4/2006 | Spataro et al. | ................. 709/224 |
| 2006/0101328 A1 * | 5/2006 | Albornoz et al. | ............. 715/512 |
| 2006/0136511 A1 * | 6/2006 | Ngo et al. | ...................... 707/203 |
| 2006/0136837 A1 * | 6/2006 | Ben-Shachar et al. | ........ 715/783 |
| 2006/0235984 A1 * | 10/2006 | Kraus et al. | .................... 709/228 |
| 2007/0016650 A1 * | 1/2007 | Gilbert et al. | ................. 709/207 |

(Continued)

FOREIGN PATENT DOCUMENTS

CN    101556593 A    10/2009

OTHER PUBLICATIONS

"Co-authoring overview (SharePoint Server 2010)", Retrieved at << http://technet.microsoft.com/en-us/library/ff718249.aspx >>, Jun. 4, 2010, pp. 2.

(Continued)

*Primary Examiner* — Maikhanh Nguyen
(74) *Attorney, Agent, or Firm* — Jim Ross; Leonard Smith; Micky Minhas

(57) ABSTRACT

Architecture that provides a technique whereby version information is tracked and presented for a given document, in the document. The version information can be presented or accessed using a dropdown user interface (UI) navigation model which employs animation to assist users in tracking which user is making a change and when the change is made. Moreover, a user can select a specific version item to navigate back to the content associated with changes made, as part of collaboration, for example. The dropdown menu includes elements that comprise user tiles, user name, last saved date, and so on. Additionally, a user can jump between documents within a single UI. In an email embodiment, users communicating via email as part of the collaboration can be presented with a side-by-side view of the messages communicated during the collaboration, and the corresponding change to the document content.

20 Claims, 7 Drawing Sheets

(56) References Cited

U.S. PATENT DOCUMENTS

| | | | |
|---|---|---|---|
| 2007/0250506 A1* | 10/2007 | Stevens et al. | 707/8 |
| 2008/0059539 A1 | 3/2008 | Chin et al. | |
| 2008/0263442 A1 | 10/2008 | Plumley et al. | |
| 2009/0006936 A1* | 1/2009 | Parker et al. | 715/200 |
| 2009/0055483 A1* | 2/2009 | Madan et al. | 709/206 |
| 2010/0281384 A1* | 11/2010 | Lyons et al. | 715/723 |

OTHER PUBLICATIONS

Morochove, Richard, "Adobe's Acrobat.com Document Collaboration Service", Retrieved at << http://www.pcworld.com/businesscenter/article/146490/first_look_adobes_acrobatcom_document_collaboration_service.html >>, Jun. 1, 2008, pp. 5.

Roe, David, "Central Desktop Adds Document Collaboration for Microsoft Office Users", Retrieved at << http://www.cmswire.com/cms/document-management/central-desktop-adds-document-collaboration-for-microsoft-office-users-007454.php >>, May 6, 2010, pp. 3.

"DocVerse", Retrieved at << http://www.docverse.com/features >>, Retrieved Date: Aug. 16, 2010, pp. 4.

"Notice on the First China Office Action", Mailed Date: Jan. 29, 2013, Application No. 201110364234.0, Filed Date: Nov. 3, 2011, pp. 10.

* cited by examiner

VERSION HISTORY INSIDE DOCUMENT

BACKGROUND

Collaboration is a widely-used technique for providing increased productivity and effectiveness in corporate environments. However, problems exist at least with knowing the version of the content (in the document) on which work is being performed is an important aspect of collaboration. For example, consider that a single document is the focus of collaboration sharing among a group of users. In this typical case, each user can make updates to the document and the updates will then be merged into the single document. However, the timing of the updates can pose problems as well as who made the updates to a given piece of content. Generally, the chronology of the updates needs to be tracked so that the final version contains all the updates and when made in the proper order. Moreover, this becomes particularly problematic when using email for sending the document updates.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a technique whereby version information is tracked and presented for a given document, in the document. The version information can be presented or accessed using a dropdown user interface (UI) navigation model which employs animation to assist users in tracking which user is making a change and when the change is made. Moreover, a user can select a specific version item to navigate back to the content associated with changes made, as part of collaboration, for example. The dropdown menu includes elements that comprise user tiles, user name, last saved date, and so on. Additionally, a user can jump between documents within a single UI.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
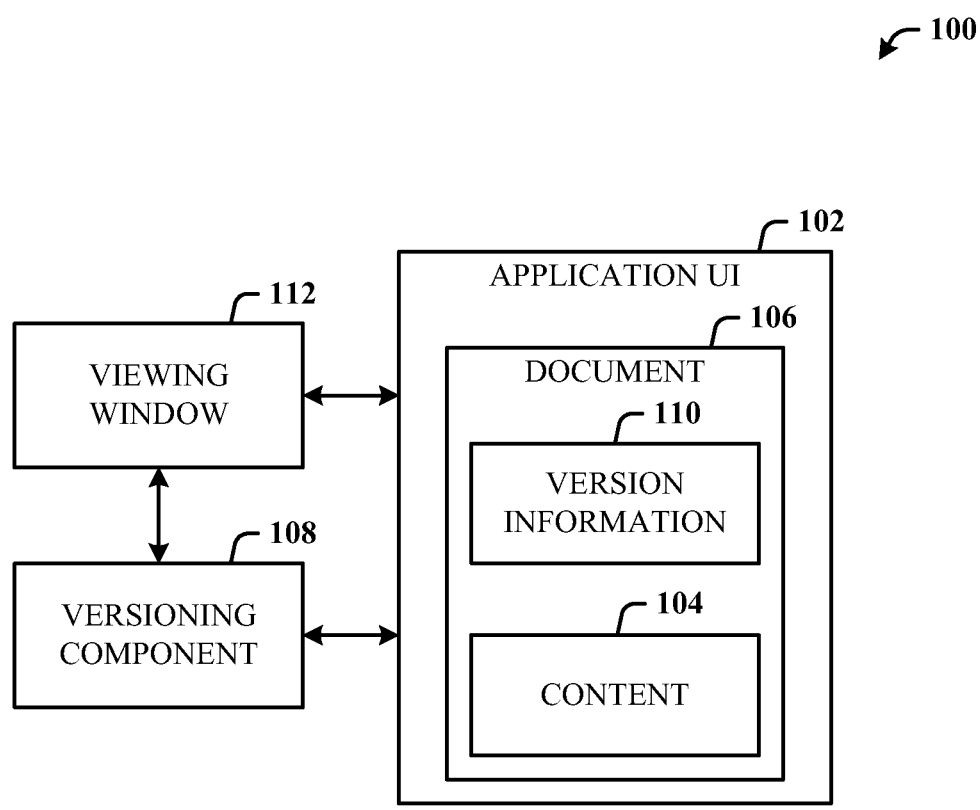
FIG. 1 illustrates a computer-implemented versioning system in accordance with the disclosed architecture.

The disclosed architecture assists collaboration on a document by multiple users that make incremental changes to document content. Version history information is presented, and when an item of version history is selected, the associated change is emphasized (e.g., highlighted) in the document.

In an email embodiment, users communicating via email as part of the collaboration can be presented with a side-by-side view of the messages communicated during the collaboration, and the corresponding change to the document content. For example, if six emails were employed on collaboration of a document and six corresponding changes to the document content were made, selection of the fourth item of version information in the document will activate presentation of the associated fourth email message to assist in providing additional context as to why the change was made.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented versioning system 100 in accordance with the disclosed architecture. The system 100 includes an application user interface 102 (e.g., a word processor, spreadsheet, etc.) that enables the presentation and edit of content 104 of a document 106 of an application (e.g., a word processor, spreadsheet, etc.). A versioning component 108 tracks and presents version information 110 of the document 106 based on edits made to the content 104 as part of collaboration of multiple users. The version information 110 is presented as part of (e.g., in) the document 106.

The collaboration can be performed in combination with a viewing window 112 that presents an edit and corresponding version information in association with user identity information of a user that made the edit. The viewing window 112 can be a user interface of a messaging application (e.g., email) that processes messages communicated between the users in combination with the collaboration. The messages are presented concurrently with the document 106, where concurrency is in a messaging user interface of the messaging application (e.g., email). The version information 110 or portions thereof can be propagated into the message during the collaboration. The state of user interaction with the document content 104 is animated as part of the version information 110.

The version information 110 includes at least one of document name, version count, identity information of a user that made the edit, date, time, chronological information relative to other edits, or sharing information. The version information 110 can be presented in the document 106 as a dropdown menu, for example, via which different versions of the document 106 can be selected for presentation. The edit of a given user is emphasized in the document 106 in response to selection of the user in the dropdown menu.

The viewing window 112 can be presented in combination with the application UI in a common (or single) user interface.

Figure 2:
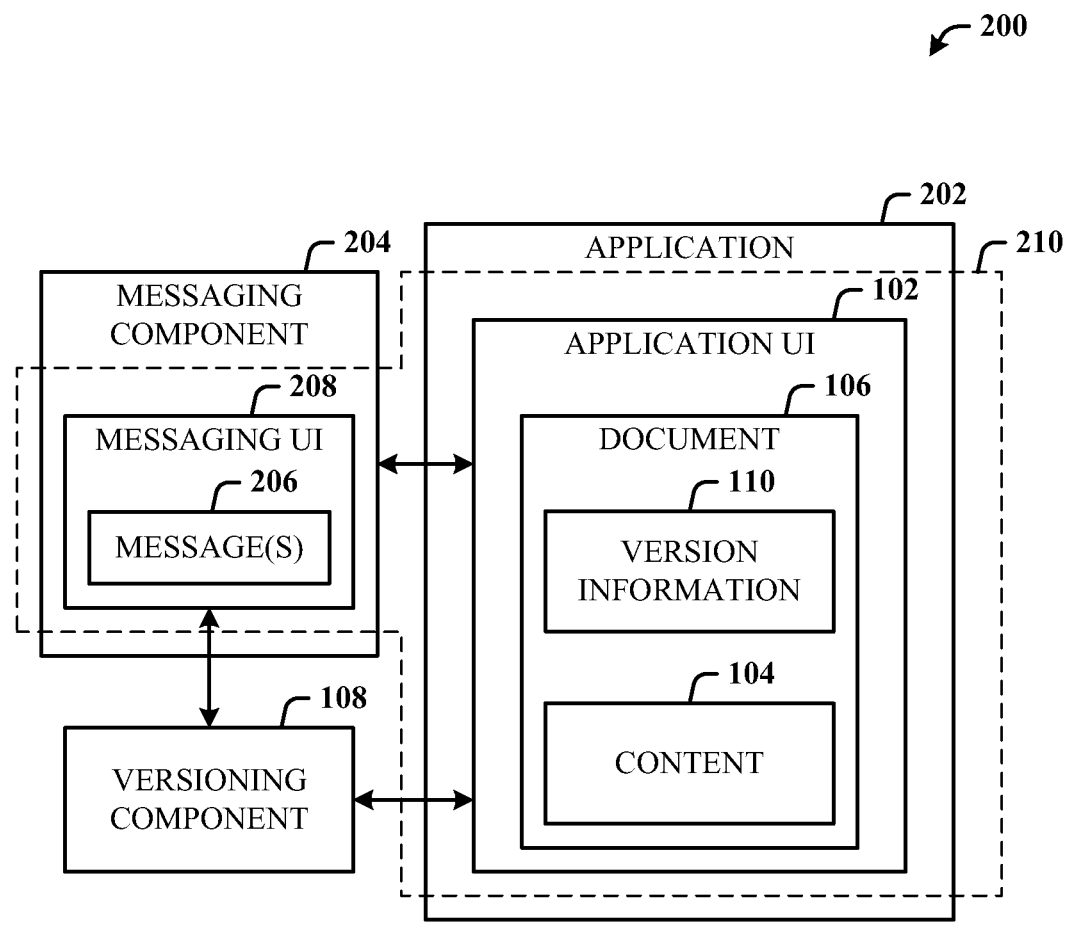
FIG. 2 illustrates an alternative embodiment of a versioning system that employs email in combination with document collaboration.

FIG. 2 illustrates an alternative embodiment of a versioning system 200 that employs email in combination with document collaboration. The system 200 includes the application user interface 102 of an application 202 (e.g., word processing application) that enables presentation and edit of the content 104 (e.g., text, media, links, etc.) of the document 106 during collaboration by multiple users. A messaging component 204 (e.g., email application) processes and presents message(s) 206 (or dialog) in a messaging UI 208, the message(s) 206 being communicated between the users during the collaboration. The versioning component 108 presents the version information 110 in the document 106 based on edits made to the content 104 by the users.

The document 106 and messaging component 204 are presented concurrently during the collaboration to show dialog (messages) between the collaboration users and edits inserted by the collaboration users into the document 106. The version information 110 or portions thereof is propagated into the message (message(s) 206) during the collaboration. The version information 110 can include one or more of state (e.g., "User1 is editing the document") of user interaction with the content, document name (e.g., Doc1), version count (e.g., three versions), identity information of a user (e.g., User1 made the edit) that made the edit, date, time, chronological information (e.g., "the latest") relative to other edits, and/or sharing information (e.g., "three users are sharing Doc1"). The version information 110 can be presented in the document 106 via a dropdown menu via which different versions of the document 106 can be selected for presentation. The edit of a given user is emphasized (e.g., highlighted, circumscribed by a box, differentiating font, differentiating style, etc.) in the document 106 in response to selection of the user in the dropdown menu. The collaboration can be initiated via the messaging component 204 and navigation is facilitated between the messaging component (e.g., messaging UI 208) and the document 106. Note also that the messaging UI 208 and the application UI 102 can be presented side-by-side as a common (or single) user interface 210.

Figure 3:
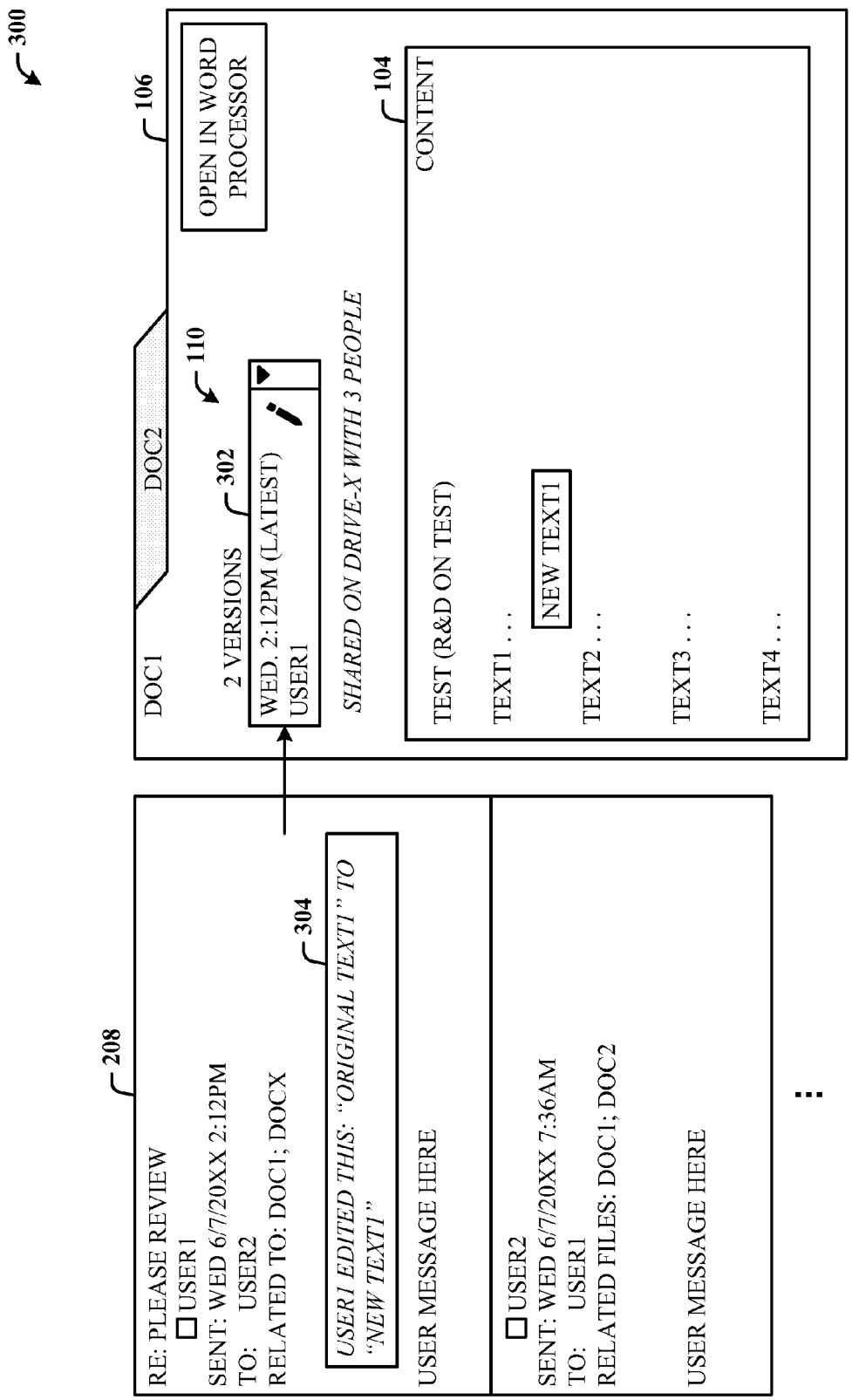
FIG. 3 illustrates an exemplary system that employs the version information in the document.
Figure 4:
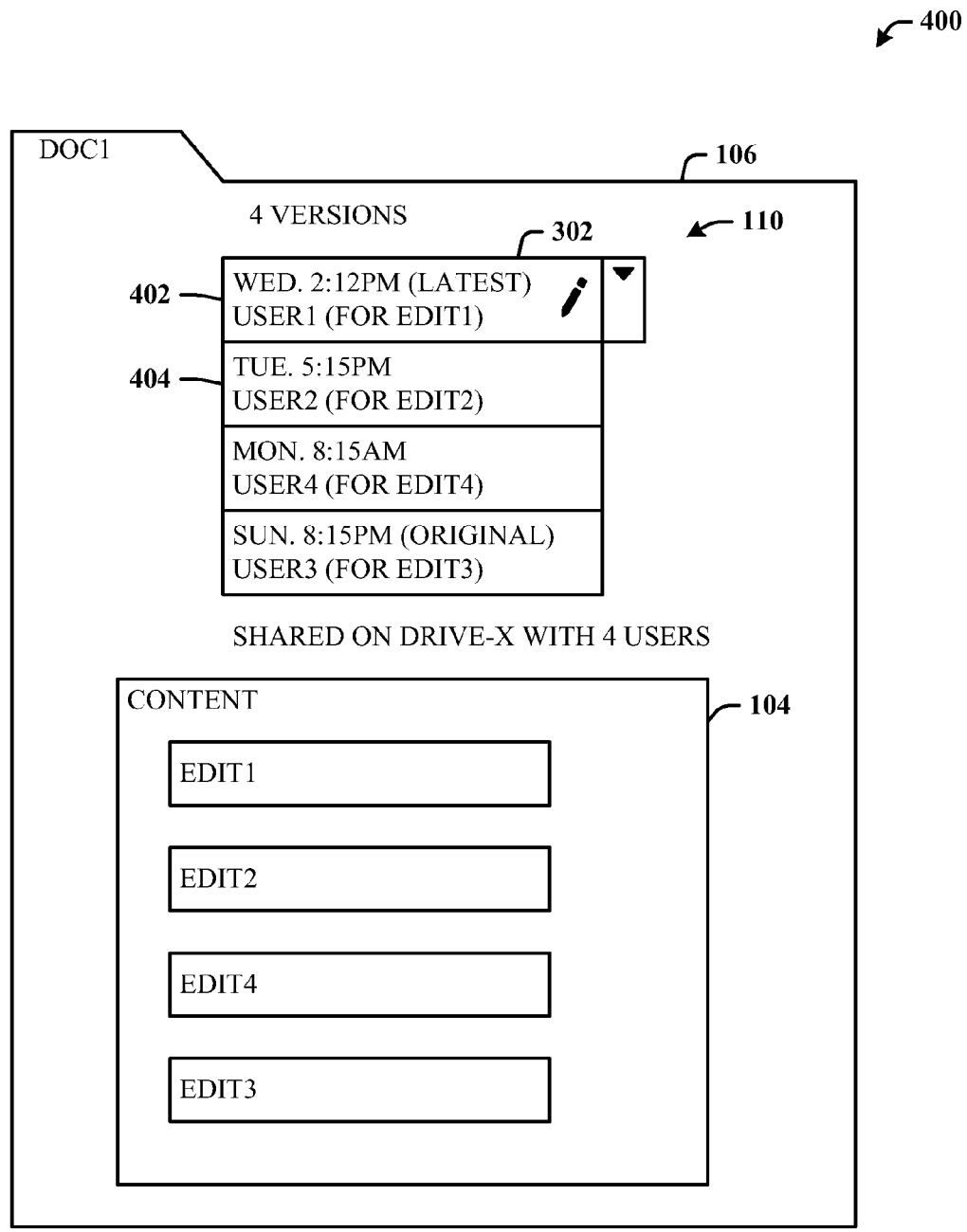
FIG. 4 illustrates an exemplary presentation technique 400 for the version information.

FIG. 3 illustrates an exemplary system 300 that employs the version information 110 in the document 106. Here, the messaging UI 208 shows two messages for a first user (USER1) and a second user (USER2). The first user makes edits (NEW TEXT1) into the document content 104 (also referred to as the ORIGINAL TEXT1). This editing event is recorded and presented in the version information 110 with the timestamp at which time and date the editing occurred, by which user, and with the chronological information (e.g., latest), version count information (e.g., two versions), document name (DOC1), and location of the shared media (e.g., shared on drive-X with three people), for example. Portions of the version information 110 (as previously described) can be presented in a dropdown menu 302, as is illustrated in FIG. 4. Once the edit by the first user has been made, a notification 304 can be inserted back into the message UI 208 in association with the dialog of the first user. If there are no edits yet made to the document 106, the version information 110 can be made unelectable (inaccessible) since no other version information is available.

FIG. 4 illustrates an exemplary presentation technique 400 for the version information 110. Here, the dropdown menu 302 expands to four document versions: the latest version, the original version, and two intermediate versions (by User2 and User4). The corresponding edits of the users are shown in the content 104. State (e.g., draft—you are editing . . . ) of the editing by the first user can be part of the animation of the portion 402 of the version information 110. If a user selects a second portion 404 of the version information 110 the corresponding edits in the content can also be emphasized (e.g., highlighted). Additionally, the associated message in the message UI 208 (of FIG. 3) can be annotated or selected to draw attention of the viewer to the associated message(s).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
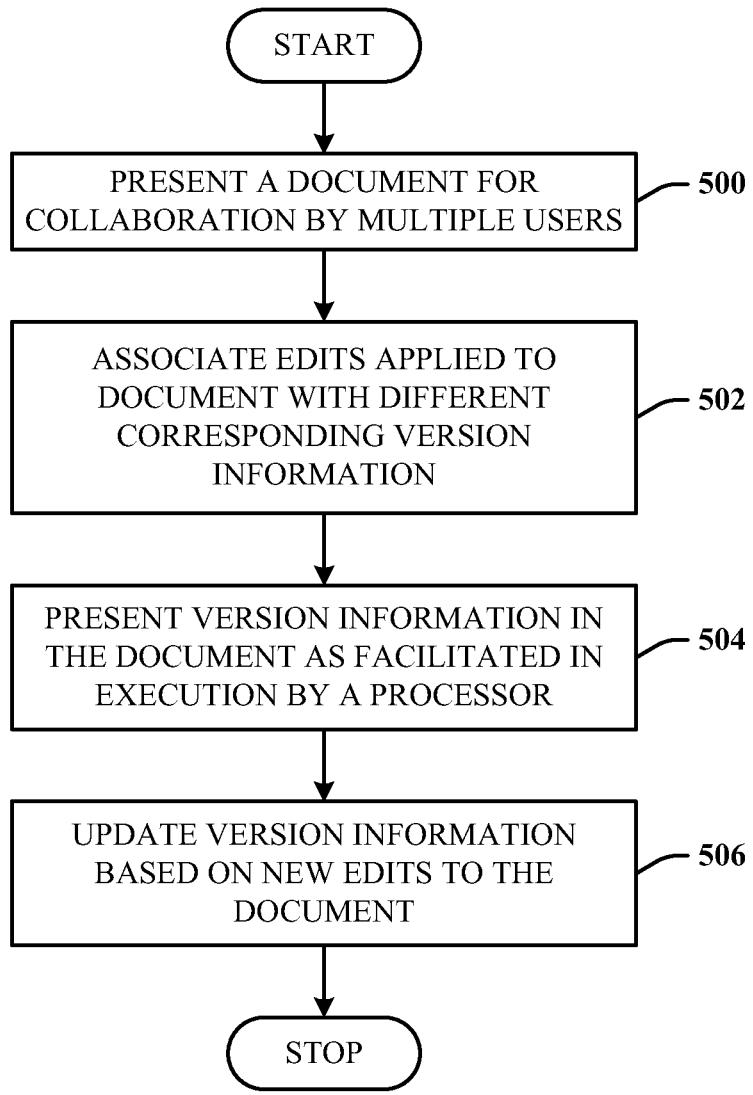
FIG. 5 illustrates a computer-implemented versioning method in accordance with the disclosed architecture.

FIG. 5 illustrates a computer-implemented versioning method in accordance with the disclosed architecture. At 500, a document is presented for collaboration by multiple users. At 502, edits applied to the document (e.g., as part of the collaboration) are associated with different corresponding version information. At 504, the version information is presented in the document as facilitated in execution by a processor. At 506, the version information is updated based on new edits to the document.

Figure 6:
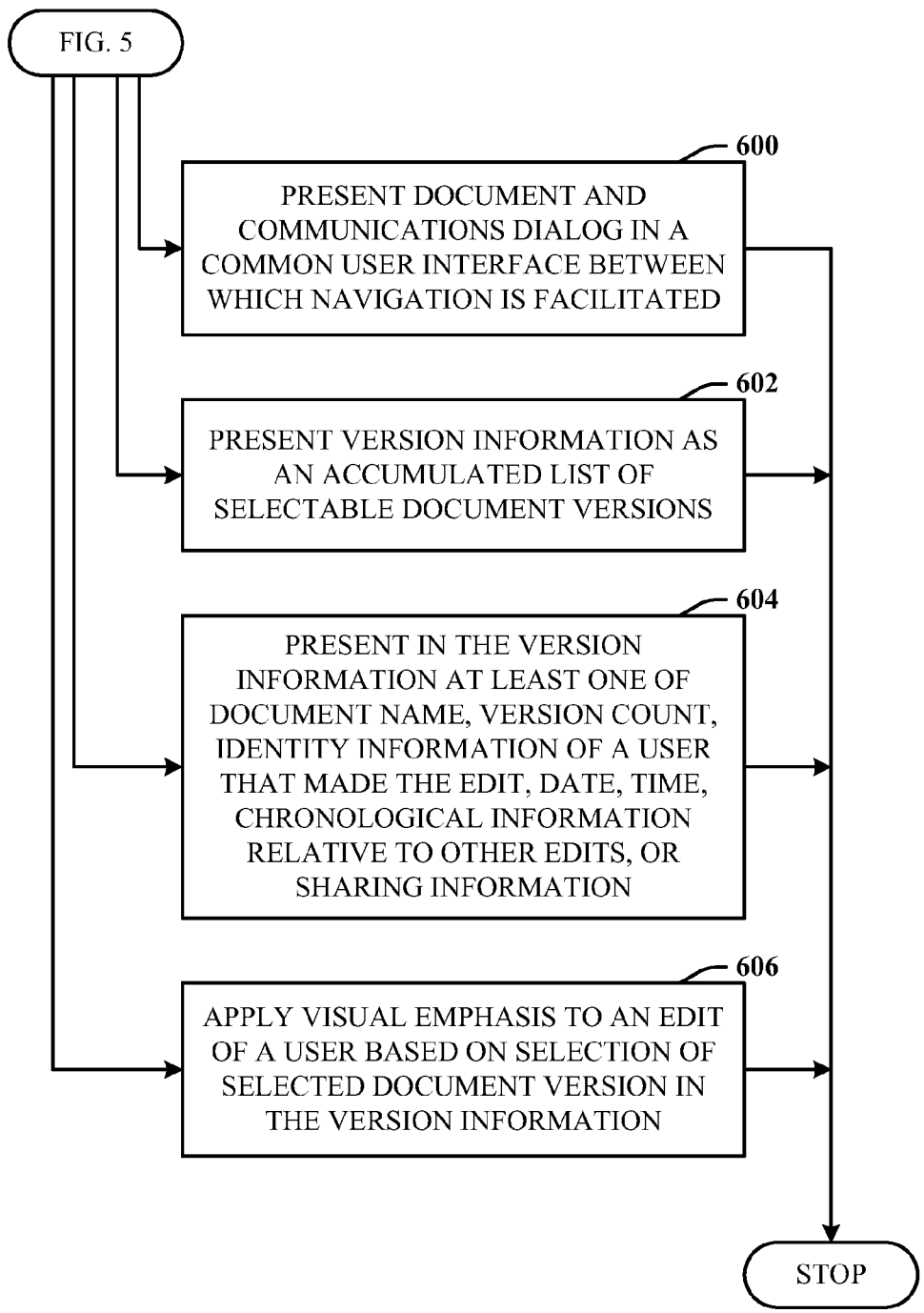
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, the document and communications dialog are presented in a common user interface between which navigation is facilitated. At 602, the version information is presented as an accumulated list of selectable document versions. At 604, the version information is presented as including at least one of document name, version count, identity information (e.g., name, alias, etc.) of a user that made the edit, date, time, chronological information relative to other edits, or sharing information. At 606, visual emphasis is applied to an edit of a user based on selection of selected document version in the version information.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
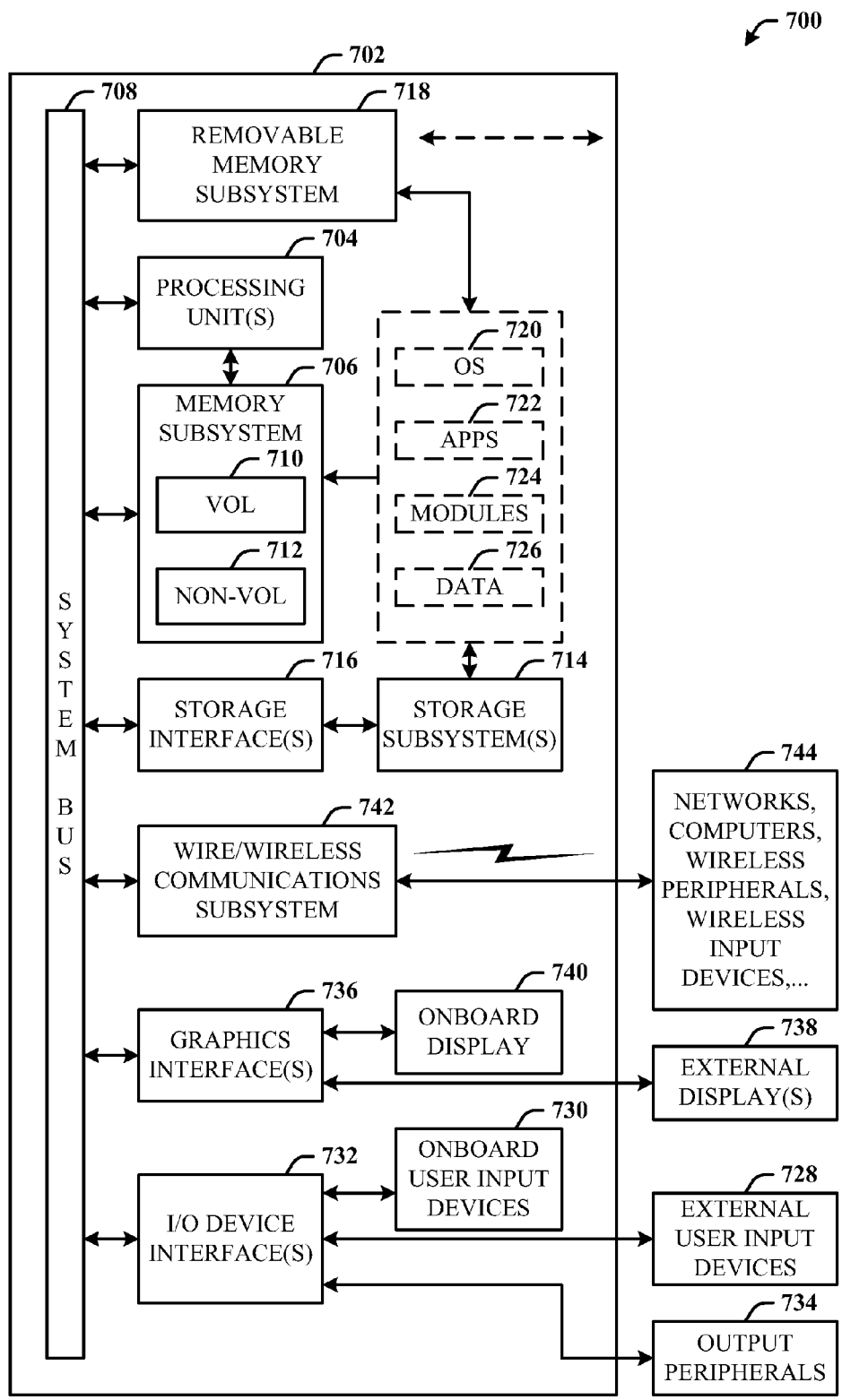
FIG. 7 illustrates a block diagram of a computing system that executes versioning in accordance with the disclosed architecture.

Referring now to FIG. 7, there is illustrated a block diagram of a computing system 700 that executes versioning in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the entities and components the system 300 of FIG. 3, the entities and components of the technique 400 of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented versioning system, comprising:
    an application user interface that enables presentation of content of a document of a collaboration application, presentation of version information as part of the document, and enables editing of the content of the document of the application;
    a versioning component configured to track and present updated version information as part of the document in the application user interface based on edits made to the content as part of collaboration of multiple users, the updated version information presented as part of the document, wherein the collaboration is performed in combination with a viewing window that presents an edit and version information in association with user identity information of a user that made the edit, and the viewing window is a user interface of a messaging application that processes messages communicated between the users in combination with the collaboration; and
    a processor that executes computer-executable instructions in a memory associated with at least the versioning component.

2. The system of claim 1, wherein the messages are presented concurrently with the document.

3. The system of claim 1, wherein the version information or portions thereof is propagated into the message during the collaboration.

4. The system of claim 1, wherein state of user interaction with the document content is animated as part of the version information.

5. The system of claim 1, wherein the version information includes at least one of document name, version count, identity information of a user that made the edit, date, time, chronological information relative to other edits, or sharing information.

6. The system of claim 1, wherein the version information is presented in the document as a dropdown menu via which different versions of the document can be selected for presentation.

7. The system of claim 6, wherein the edit of a given user is emphasized in the document in response to selection of the user in the dropdown menu.

8. A computer-implemented versioning system, comprising:
    an application user interface that enables presentation of content of a document of a collaboration application, and edit of the content of the document of the application during collaboration of multiple users, and also enables presentation of version information as part of the document;
    a messaging component configured to process and present messages communicated between the users during the collaboration in the application user interface;
    a versioning component configured to present updated version information as part of the document in the application user interface based on edits made to the content by the users;
    wherein the collaboration is performed in combination with a viewing window that presents an edit and version information in association with user identity information of a user that made the edit, and the viewing window is a user interface of a messaging application that processes messages communicated between the users in combination with the collaboration; and
    a processor that executes computer-executable instructions in a memory associated with at least the messaging component and the versioning component.

9. The system of claim 8, wherein the document and the messaging component are presented concurrently during the collaboration to show dialog between the collaboration users and edits inserted by the collaboration users into the document.

10. The system of claim 8, wherein the version information or portions thereof is propagated into the message during the collaboration.

11. The system of claim 8, wherein the version information includes at least one of state of user interaction with the content, document name, version count, identity information of a user that made the edit, date, time, chronological information relative to other edits, or sharing information.

12. The system of claim 8, wherein the version information is presented in the document via a dropdown menu via which different versions of the document can be selected for presentation, and the edit of a given user is emphasized in the document in response to selection of the user in the dropdown menu.

13. The system of claim 8, wherein the collaboration is initiated via the messaging component and navigation is facilitated between the messaging component and the document.

14. A computer-implemented versioning method, comprising acts of:
presenting a document for editing of document content through collaboration by multiple users;
associating edits applied to the content of the document by the collaboration of multiple users with different corresponding version information;
presenting the content in the document in an application interface;
presenting the version information as part of the document within the document in the application interface,
updating the version information based on new edits to the document by the collaboration of multiple users, to obtain updated version information;
performing the collaboration in combination with a viewing window that presents an edit and version information in association with user identity information of a user that made the edit, the viewing window is a user interface of a messaging application that processes messages communicated between the users in combination with the collaboration; and
utilizing a processor that executes instructions stored in memory to perform at least the acts of associating, presenting, updating, and performing.

15. The method of claim 14, further comprising presenting the document and communications dialog in a common user interface between which navigation is facilitated.

16. The method of claim 14, further comprising presenting the version information as an accumulated list of selectable document versions.

17. The method of claim 14, further comprising presenting in the version information at least one of document name, version count, identity information of a user that made the edit, date, time, chronological information relative to other edits, or sharing information.

18. The method of claim 14, further comprising applying visual emphasis to an edit of a user based on selection of selected document version in the version information.

19. The method of claim 14, further comprising animating state of user interaction with the document content as part of the version information.

20. The method of claim 14, further comprising presenting a message concurrently with the document.

* * * * *